(No Model.)

A. ASSORATI & A. CUYÁS.
PUZZLE.

No. 478,497. Patented July 5, 1892.

WITNESSES:
Paul Johel
E. M. Clark

INVENTORS.
Antenor Assorati
Arturo Cuyás
BY
Munn & Co.
ATTORNEYS.

UNITED STATES PATENT OFFICE.

ANTENOR ASSORATI AND ARTURO CUYÁS, OF NEW YORK, N. Y., ASSIGNORS, BY DIRECT AND MESNE ASSIGNMENTS, TO THE COLUMBUS EGG COMPANY, OF SAME PLACE.

PUZZLE.

SPECIFICATION forming part of Letters Patent No. 478,497, dated July 5, 1892.

Application filed June 30, 1891. Serial No. 397,955. (No model.)

*To all whom it may concern:*

Be it known that we, ANTENOR ASSORATI and ARTURO CUYÁS, of New York city, in the county and State of New York, have invented a new and useful Improvement in Puzzles, of which the following is a full, clear, and exact description.

Our invention relates to an improvement in puzzles, and has for its object to provide a puzzle in egg form, simulating the mythical egg of Columbus, and to so construct the egg puzzle that when manipulated in a certain or predetermined manner it may be made to stand upon its end.

A further object of the invention is to construct the puzzle in an economic manner and to so arrange the interior mechanism that it will be exceedingly simple but will require considerable expertness upon the part of the performer to arrive at a solution of the puzzle.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1:
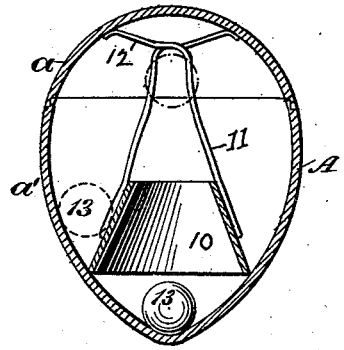
Figure 2:
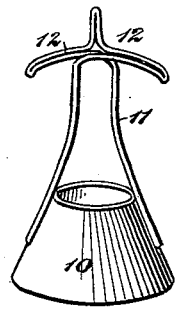
Figure 3:
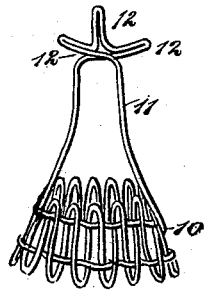

Figure 1 is a central vertical section through the puzzle. Fig. 2 is a perspective view of the interior mechanism thereof. Fig. 3 is a perspective view of a modified form of said interior mechanism.

The body of the puzzle consists of a shell A, which may be made of any desired material—as, for instance, rubber, metal, glass, wood, celluloid, &c. The shell is in the form of an egg and is preferably made in two sections $a$ and $a'$, which sections, when the puzzle is complete, are ordinarily firmly united in any approved manner. Within the shell a cone 10 is located, open at top and bottom, and to opposite sides of this cone the members of an essentially U-shaped track 11 are attached. This track is ordinarily made of metal, and the cone may be made of cardboard or its equivalent—wood, metal, or other desired material. At the bow-section of the track—that is, at the end farthest removed from the cone—a series of prongs 12 is formed, the said prongs being ordinarily made of wire and integral with the track. Preferably three prongs only are employed, and the prongs are curved, as shown in Figs. 1, 2, and 3, and are arranged in a manner to bring two of the prongs nearly opposite, the other prong being opposite the junction of the two opposed ones, or practically so. The arrangement of the prongs, however, may be varied without departing from the spirit of the invention, the purpose of the said prongs being to support the cone and track within the casing by engagement, preferably, with what appears as the inner surface of the butt of the egg-shell, as shown in Fig. 1, the cone at its lower end resting upon the inner wall of the shell over the point thereof. Two of the spurs or prongs (those nearly in alignment) are intended to serve as guides to direct a weight employed upon the track 11. The weight 13 is preferably in the shape of a ball, as illustrated, and is free to move within the shell. The track at its outer end is of a sufficient width to support the weight or ball when placed thereon; but near the cone the track is of such width that the ball or weight will drop down between the members thereof as the members of the track diverge to meet the cone.

In Fig. 3 we have illustrated a slight modification of the interior mechanism of the puzzle, in which it will be observed that the cone constitutes an integral portion of the track, the entire structure being of wire or a like material.

In the operation of the puzzle, the ball being outside of the cone, the shell is manipulated to bring the ball upon the upper narrow portion of the track 11, and when the ball is thus located the shell is given a quick downward movement—that is to say, the point is carried quickly downward so that the ball will roll from the track into the cone and through it to the point of the shell, as shown in positive lines, Fig. 1. When the ball is in this position, the egg may be readily stood upon its point. The position of the ball when outside of the cone is indicated in dotted lines, Fig. 1, and in the same manner the ball is indicated in proper position upon the track.

Having thus described our invention, we claim as new and desire to secure by Letters Patent—

In a puzzle, the combination, with an egg-like shell, of a casing shaped substantially as a truncated cone, fixedly located within one end of the shell, a track attached to said casing and extending to the opposite end of the shell, the said track being essentially U-shaped and its members made to diverge at their connection with the casing, and a movable weight adapted to travel upon the track and enter the casing, as set forth.

ANTENOR ASSORATI.
ARTURO CUYÁS.

Witnesses:
J. FRED ACKER,
E. M. CLARK.